United States Patent
Yoshikawa

(10) Patent No.: US 8,575,782 B2
(45) Date of Patent: Nov. 5, 2013

(54) POWER TRANSMISSION APPARATUS, POWER TRANSMISSION/RECEPTION APPARATUS, AND METHOD OF TRANSMITTING POWER

(75) Inventor: Hiroyasu Yoshikawa, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 904 days.

(21) Appl. No.: 12/724,938

(22) Filed: Mar. 16, 2010

(65) Prior Publication Data
US 2010/0244578 A1    Sep. 30, 2010

(30) Foreign Application Priority Data

Mar. 31, 2009    (JP) .................... 2009-088395

(51) Int. Cl.
*H01F 38/00*    (2006.01)
(52) U.S. Cl.
USPC ............................................. 307/104
(58) Field of Classification Search
USPC ............................................. 307/104
See application file for complete search history.

(56) References Cited

U.S. PATENT DOCUMENTS

| 6,163,242 A | 12/2000 | Crewson et al. |
| 2007/0222542 A1 | 9/2007 | Joannopoulos et al. |
| 2008/0266748 A1 | 10/2008 | Lee |
| 2008/0278264 A1 | 11/2008 | Karalis et al. |
| 2010/0244577 A1* | 9/2010 | Shimokawa .................. 307/104 |

FOREIGN PATENT DOCUMENTS

| JP | 2002-544756 | 12/2002 |
| JP | 2006-230129 | 8/2006 |
| JP | 2008-508842 | 3/2008 |
| JP | 2008-160312 | 7/2008 |
| JP | 2008-301918 | 12/2008 |
| JP | 2009-510510 | 1/2009 |
| WO | WO 00/69231 | 11/2000 |
| WO | WO 2006/011769 A1 | 2/2006 |
| WO | WO 2007/008646 A2 | 1/2007 |

* cited by examiner

*Primary Examiner* — Rexford Barnie
*Assistant Examiner* — Dru Parries
(74) *Attorney, Agent, or Firm* — Greer, Burns & Crain, Ltd.

(57) ABSTRACT

A power transmission apparatus includes: a power source; a power transmission coil that transmits electric power supplied from the power source outward as magnetic energy through magnetic resonance; a peak searching unit that searches for a drive frequency at which the magnetic energy transmitted outward has a peak; a peak split detector that detects splitting of the drive frequency at which the magnetic energy transmitted outward has a peak; a selection unit that selects a higher-frequency side frequency among split drive frequencies generated by the splitting; and a drive unit that drives the power transmission coil using the frequency selected by the selection unit.

7 Claims, 12 Drawing Sheets

ELECTRIC FIELD DISTRIBUTION

MAGNETIC FIELD DISTRIBUTION

ELECTRIC FIELD DISTRIBUTION

MAGNETIC FIELD DISTRIBUTION

ELECTRIC FIELD DISTRIBUTION

MAGNETIC FIELD DISTRIBUTION

ELECTRIC FIELD DISTRIBUTION

MAGNETIC FIELD DISTRIBUTION

ELECTRIC FIELD DISTRIBUTION

MAGNETIC FIELD DISTRIBUTION

POWER TRANSMISSION APPARATUS, POWER TRANSMISSION/RECEPTION APPARATUS, AND METHOD OF TRANSMITTING POWER

CROSS-REFERENCE TO RELATED APPLICATIONS

This application is based upon and claims the benefit of priority of the prior Japanese Patent Application No. 2009-88395, filed on Mar. 31, 2009, the entire contents of which are incorporated herein by reference.

FIELD

The present invention relates a power transmission apparatus, a power transmission/reception apparatus, and a method for supplying electric power from a power transmission coil to a power reception coil through magnetic resonance.

BACKGROUND

Technologies for wirelessly supplying electric power using electromagnetic induction or radio waves have been known hitherto. Recently, technologies for wirelessly supplying electric power using magnetic resonance that causes a magnetic field to resonate have also been considered. Magnetic resonance, also called magnetic field resonance, is a phenomenon in which magnetic field coupling occurs between two coils in resonance, thereby generating energy transmission.

SUMMARY

According to an aspect of the invention, a power transmission apparatus includes: a power source; a power transmission coil that transmits electric power supplied from the power source outward as magnetic energy through magnetic resonance; a peak searching unit that searches for a drive frequency at which the magnetic energy transmitted outward has a peak; a peak split detector that detects splitting of the drive frequency at which the magnetic energy transmitted outward has a peak; a selection unit that selects a higher-frequency side frequency among split drive frequencies generated by the splitting; and a drive unit that drives the power transmission coil using the frequency selected by the selection unit.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Supplying power using magnetic resonance is characterized by high efficiency and long transmission distance compared with electromagnetic induction. More specifically, supply of power is possible even when two coils are spaced apart from each other by several tens of centimeters or more. Here, there are cases in which it is considered to be preferable that there be a low magnetic field or no magnetic field at all in the space between the two coils.

In view of the above, the disclosed technology provides a power transmission apparatus, a power transmission/reception apparatus, and a method for power transmission in which the strength of a magnetic field between a power transmission coil and a power reception coil has been reduced.

In the power transmission apparatus, power transmission/reception apparatus, and method for power transmission according to the present invention, when power supplied by a power source is transmitted outward as magnetic energy through magnetic resonance, splitting of a drive frequency at which the magnetic energy transmitted outward has a peak is detected, and the higher of the split drive frequencies is used to drive a power transmission coil.

The power transmission apparatus, power transmission/reception apparatus, and method for power transmission disclosed by the present invention, advantageously provide a power transmission apparatus, a power transmission/reception apparatus, and a method for power transmission in which the strength of a magnetic field between a power transmission coil and a power reception coil has been reduced.

Hereinafter, embodiments of the power transmission apparatus, power transmission/reception apparatus, and method for power transmission disclosed by the invention are described in detail with reference to the attached drawings. Note that the present invention is not limited to these embodiments.

Figure 1:
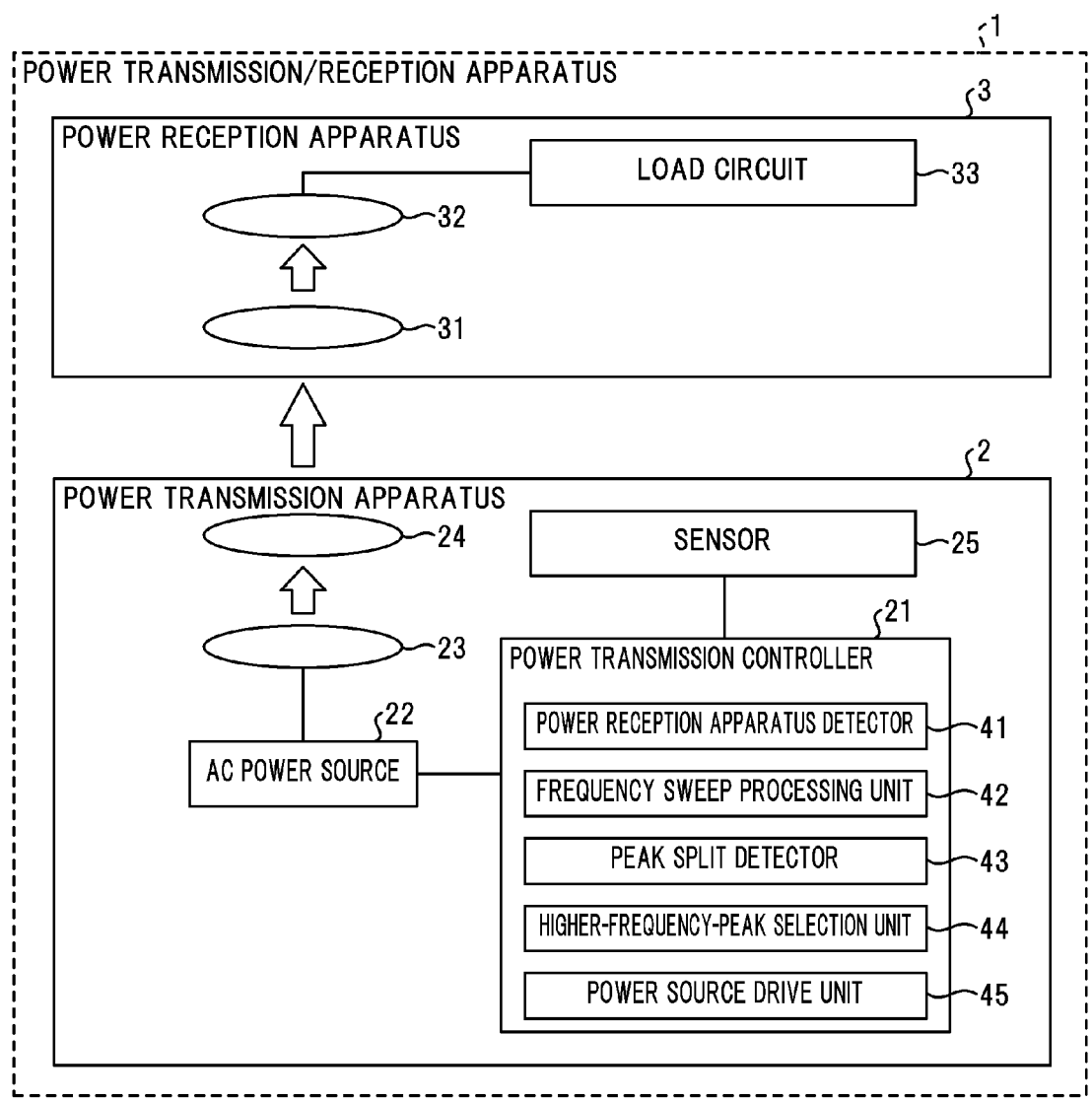
FIG. 1 is a schematic configuration diagram illustrating a schematic configuration of a power transmission/reception apparatus according to the present embodiment.

FIG. 1 is a schematic configuration diagram illustrating a configuration of a power transmission/reception apparatus according to the present embodiment. A power transmission/reception apparatus 1 illustrated in FIG. 1 is a system including a power transmission apparatus 2 and a power reception apparatus 3. The power transmission apparatus 2 includes therein a power transmission controller 21, an ac power source 22, a power supply coil 23, a power transmission coil 24, and a sensor 25. A power reception apparatus 3 includes a power reception coil 31, a power transfer coil 32, and a load circuit 33.

The power transmission controller 21 and the power reception coil 31 are both LC resonance circuits. The capacitor component of the LC resonance circuit may be realized by a capacitor, or a stray capacitance generated by making both ends of the coil open. In an LC resonance circuit, its resonance frequency f is determined by Equation (1), where L is the inductance and C is the capacitance of the circuit.

$$f = \frac{1}{2\pi\sqrt{LC}} \quad (1)$$

When the resonance frequency of the power transmission coil 24 is sufficiently close to the resonance frequency of the power reception coil 31 and the distance between the power transmission coil 24 and the power reception coil 31 is sufficiently small, magnetic resonance may be generated between the power transmission coil 24 and the power reception coil 31.

Hence, when magnetic resonance is generated while the power transmission coil 24 is in a resonant state, magnetic energy may be transmitted to the power reception coil 31 from the power transmission coil 24.

The power supply coil 23 supplies electric power obtained from the ac power source 22 to the power transmission coil 24 through electromagnetic induction. The power supply coil 23 and the power transmission coil 24 are arranged in such a manner as to realize a gap therebetween and arrangement causing generation of electromagnetic induction. The power transmission coil 24 is caused to resonate through electromagnetic resonance via the power supply coil 23, and hence electrical connection between the power transmission coil 24 and other circuits is not required, and the resonance frequency of the power transmission coil 24 may be designed freely with high precision.

The power transfer coil 32 and the power reception coil 31 are arranged in such a manner as to allow electromagnetic induction to be generated therebetween. When the power reception coil 31 resonates as a result of magnetic field resonance, energy is transferred from the power reception coil 31 to the power transfer coil 32 through electromagnetic induction. The energy transferred through electromagnetic induction to the power transfer coil 32, which is electrically connected to the load circuit 33, is supplied to the load circuit 33 as electric power. The load circuit 33 may be any circuit including, for example, a battery.

In this manner, since electric power is taken out from the power reception coil 31 through electromagnetic induction via the power-taking-out coil 32, electrical connections between the power reception coil 31 and other circuits are not required, and the resonance frequency of the power reception coil 31 may be designed freely with high precision.

The ac power source 22 outputs an ac current having a frequency and an amplitude specified by the power transmission controller 21. The frequency of the ac power source 22 is hereinafter called a drive frequency. The power supply coil 23, which is electrically connected to the ac power source 22 oscillates at the drive frequency. Hence, the power transmission coil 24 resonates at the drive frequency. Similarly, the power reception coil 31 resonates at the drive frequency.

In this manner, in the power transmission/reception apparatus 1, electric power of the ac power source 22 is supplied to the load circuit 33 through electromagnetic induction between the power supply coil 23 and the power transmission coil 24, magnetic resonance between the power transmission coil 24 and the power reception coil 31, and electromagnetic induction between the power reception coil 31 and the power transfer coil 32.

In the magnetic resonance between the power transmission coil 24 and the power reception coil 31, a drive frequency at which the transmitted energy has a peak, i.e., a drive frequency at which the power transmission efficiency becomes maximum, is near the resonance frequency of the coils. However, when the distance between the power transmission coil 24 and the power reception coil 31 decreases to some extent, splitting of the drive frequency at which the power transmission efficiency becomes maximum is observed.

Figure 2:
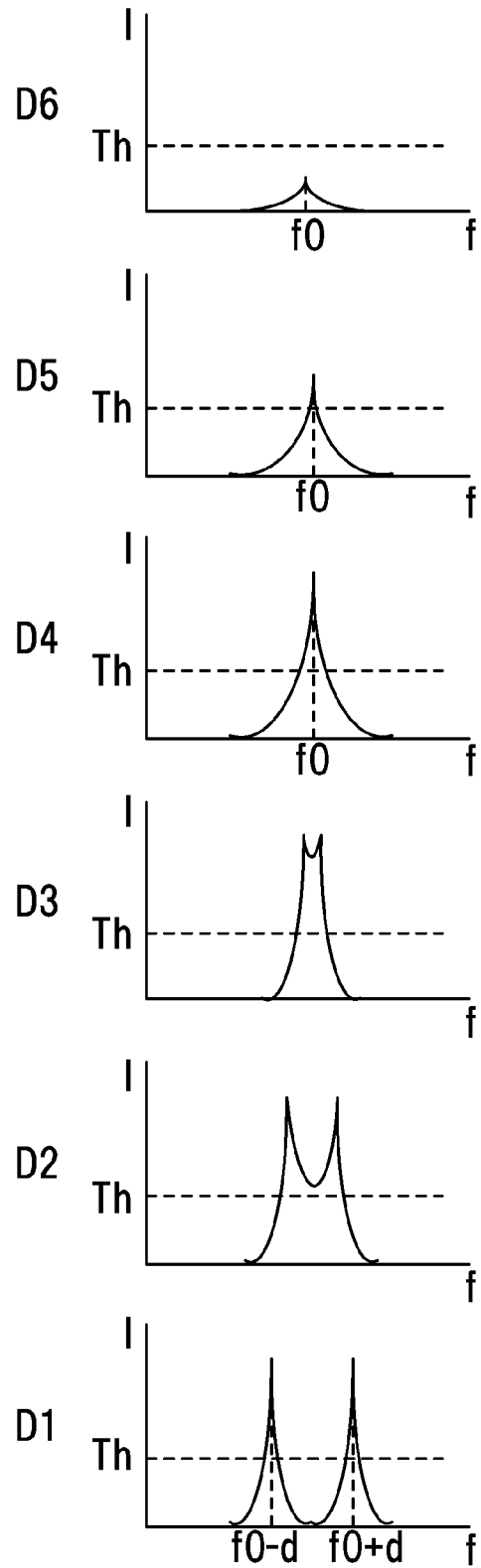
FIG. 2 is an explanatory diagram for explaining splitting of a drive frequency at which power transmission efficiency becomes maximum.

FIG. 2 is an explanatory diagram for explaining the splitting of the drive frequency at which power transmission efficiency becomes maximum. In FIG. 2, f is the drive frequency. I is the output current of the sensor 25, described later, and corresponds to the power transmission efficiency. A threshold Th is a threshold used to detect the approach of the power reception coil 31. D1 to D6 denote the distances between the power transmission coil 24 and the power reception coil 31, where D1<D2<D3<D4<D5<D6.

Referring to FIG. 2, for the distances D4 to D6, the current I has a peak at a drive frequency f0, and the value of the peak increases as the distance decreases. On the other hand, for the distances D1 to D3, the peak is split into two peaks, one on the lower frequency side and the other on the higher frequency side with respect to the drive frequency f0. Among the split peaks, the drive frequency on the higher frequency side may be denoted by f0+d, and the drive frequency on the lower frequency side may be denoted by f0−d.

Figure 3:
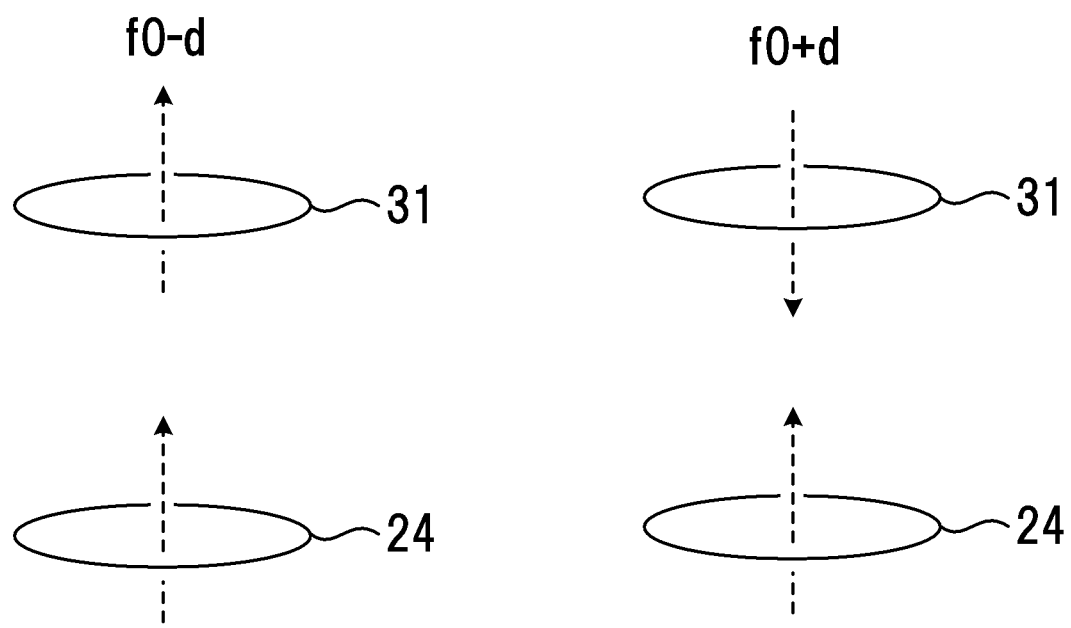
FIG. 3 is an explanatory diagram for explaining magnetic resonance when the drive frequency at which the current I has a peak has been split into f0±d.

FIG. 3 is an explanatory diagram for explaining magnetic resonance when the drive frequency at which the current I has a peak is split into f0±d. When magnetic resonance is generated at the lower frequency side drive frequency f0−d, the resonance of the power transmission coil 24 and the resonance of the power reception coil 31 have the same phase and the same magnetization direction. Hence, there exist strong magnetic fields between the power transmission coil 24 and the power reception coil 31 during supply of power based on magnetic resonance.

On the other hand, when magnetic resonance is generated at the higher frequency side drive frequency f0+d, the resonance of the power transmission coil 24 and the resonance of the power reception coil 31 have opposite phases, and hence the directions of the magnetic fields are opposite to each other. As a result, magnetic fields generated between the power transmission coil 24 and the power reception coil 31, during supply of power based on magnetic resonance, are weak compared with the case of the drive frequency f0−d, and may cancel each other out, depending on the place.

In the power transmission/reception apparatus 1, power may be supplied even in a state in which the power transmission coil 24 and the power reception coil 31 are separated by several tens of centimeters or more. Hence, another object may exist in the space between or near the power transmission coil 24 and the power reception coil 31. Considering the possibility that the object is an object such as an electronic apparatus that is susceptible to the influence of a magnetic field or a human body, it is desirable to suppress the possible influence of magnetic resonance on the space between or near the power transmission coil 24 and the power reception coil 31, i.e., to reduce the strength of the magnetic field between the power transmission coil 24 and the power reception coil 31. Hence, the power transmission/reception apparatus 1 generates magnetic resonance using the higher frequency side drive frequency f0+d.

Returning to FIG. 1, description of magnetic resonance using the higher frequency side drive frequency is continued. The sensor 25 measures a magnetic field strength near the power transmission coil 24, and outputs a current corresponding to the magnetic field strength. The power transmission controller 21 includes therein a power reception apparatus detector 41, which is a monitoring unit, a frequency sweep processing unit 42, which is a peak searching unit, a peak split detector 43, a higher-frequency-peak selection unit 44, and a power source drive unit 45.

The power reception apparatus detector 41 is a processing unit that detects whether the power reception apparatus 3 has come sufficiently close to the ac power source 22 to be able to receive wireless supply of power there from. When the ac power source 22 is being driven using a fixed frequency and amplitude and the power transmission coil 24 is resonating, the smaller the distance between the power transmission coil 24 and the power reception coil 31, the stronger the magnetic energy transmitted by the power transmission coil 24 through magnetic resonance. Hence, by driving the ac power source 22 with a fixed frequency and amplitude, and by making the sensor 25 measure the magnetic field strength near the power transmission coil 24, the approach of the power reception coil 31, i.e., the approach of the power reception apparatus 3 may be detected. More specifically, the power reception apparatus detector 41 outputs successful detection of a power reception apparatus when the output current of the sensor 25 exceeds a threshold Th.

The frequency sweep processing unit 42 obtains a change in the output of the sensor 25 by changing the drive frequency. The drive frequency is changed by sweeping the frequency in a range set in advance. The output current of the sensor 25 indicating the magnetic field strength near the power transmission coil 24 increases as the power reception coil 31 approaches the power transmission coil 24, i.e., as the power transmission efficiency increases. Hence, the processing result of the frequency sweep processing unit 42 illustrates the distribution of power transmission efficiency versus the drive frequency.

The peak split detector 43 detects splitting of the power transmission efficiency peak from the distribution of power transmission efficiency versus the drive frequency. When splitting of the peak is detected, the peak split detector 43 outputs the respective drive frequencies f0±d corresponding to the split peaks.

When the two drive frequencies f0±d are output from the peak split detector 43, the higher-frequency-peak selection unit 44 selects the drive frequency f0+d, at which the power transmission efficiency has a peak on the higher frequency side. The power source drive unit 45, by driving the ac power source using the drive frequency selected by the higher-frequency-peak selection unit 44, causes generation of magnetic resonance in which the power transmission coil 24 and the power reception coil 31 exhibit opposite phases.

Figure 4:
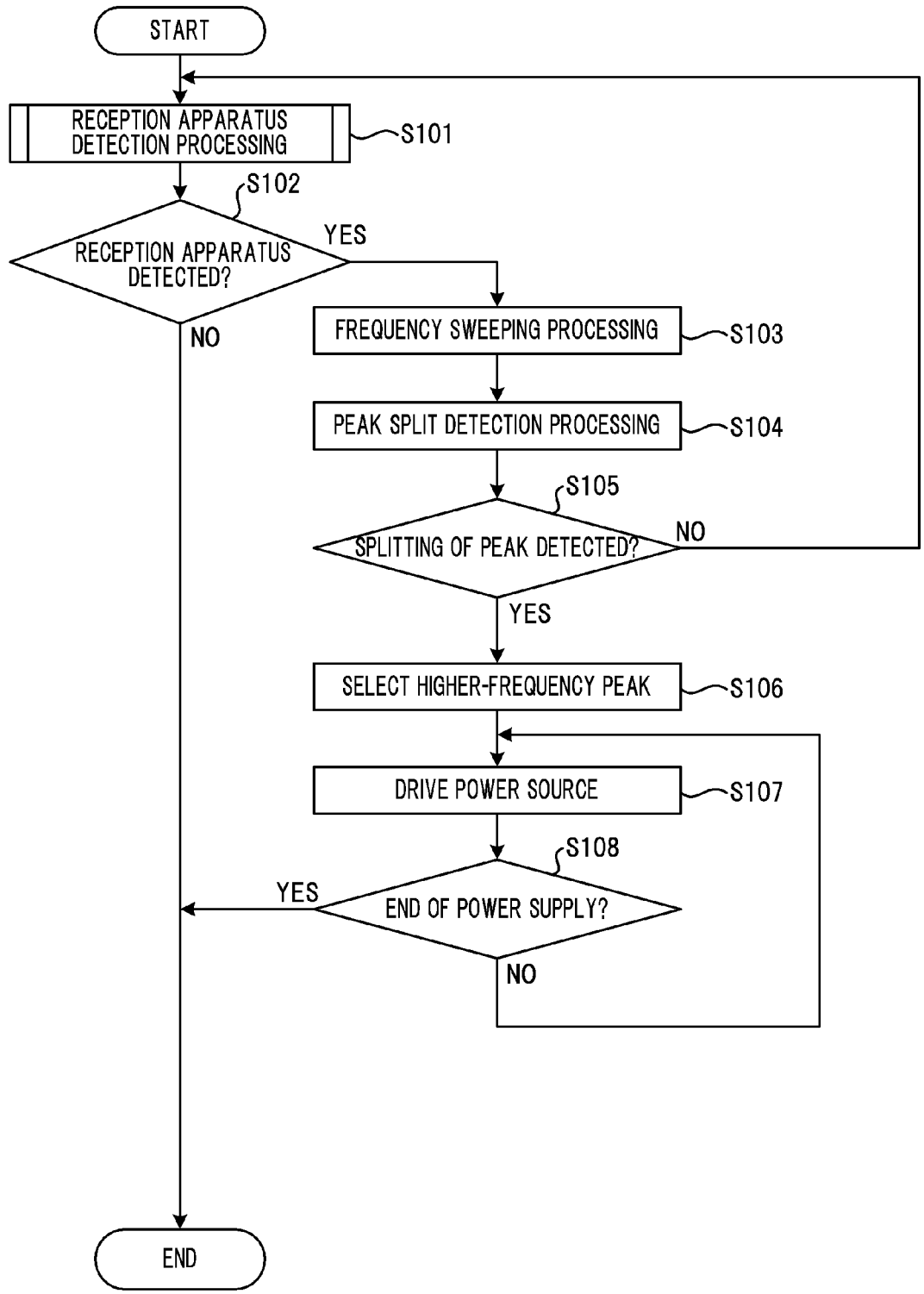
FIG. 4 is a flowchart describing the processing operation of a power transmission controller.

FIG. 4 is a flowchart describing the processing operation of the power transmission controller 21. The power transmission controller 21 periodically performs the processing operation illustrated in FIG. 4. When the processing operation is started, the power reception apparatus detector 41 performs processing for detecting a power reception apparatus (S101).

When a power reception apparatus is not detected by the power reception apparatus detection processing (No in step S102), the power transmission controller 21 stops the processing. When a power reception apparatus is detected by the power reception apparatus detection processing (Yes in step S102), the frequency sweep processing unit 42 performs frequency sweeping processing (S103). Then, the peak split detector 43, performs peak split detection processing for detecting splitting of the power transmission efficiency peak from the distribution of power transmission efficiency versus the drive frequency (S104).

When splitting of a peak has not been detected (No in S105) as the result of peak split detection processing, the flow goes back to the power reception apparatus detection processing performed by the power reception apparatus detector 41 (S101). On the other hand, when splitting of a peak has been detected (Yes in S105), the higher-frequency-peak selection unit 44 selects the higher frequency side drive frequency from among the split peaks (S106). The power source drive unit 45 drives the ac power source 22 using the drive frequency selected by the higher-frequency-peak selection unit 44 (S107), and causes magnetic resonance to be generated between the power transmission coil 24 and the power reception coil 31, thereby supplying electric power to the power reception apparatus 3.

Then, when the condition for stopping supply of power has been satisfied (Yes in step S108), the power transmission controller 21 ends processing by stopping the supply of power. The condition for stopping supply of power may be any given condition, such as an instruction to stop supply of power is input or a condition regarding power transmission efficiency. When the condition for stopping supply of power has not been satisfied (No in S108), the power transmission controller 21 continues to drive the power source (S107), thereby continuing supply of power.

Figure 5:
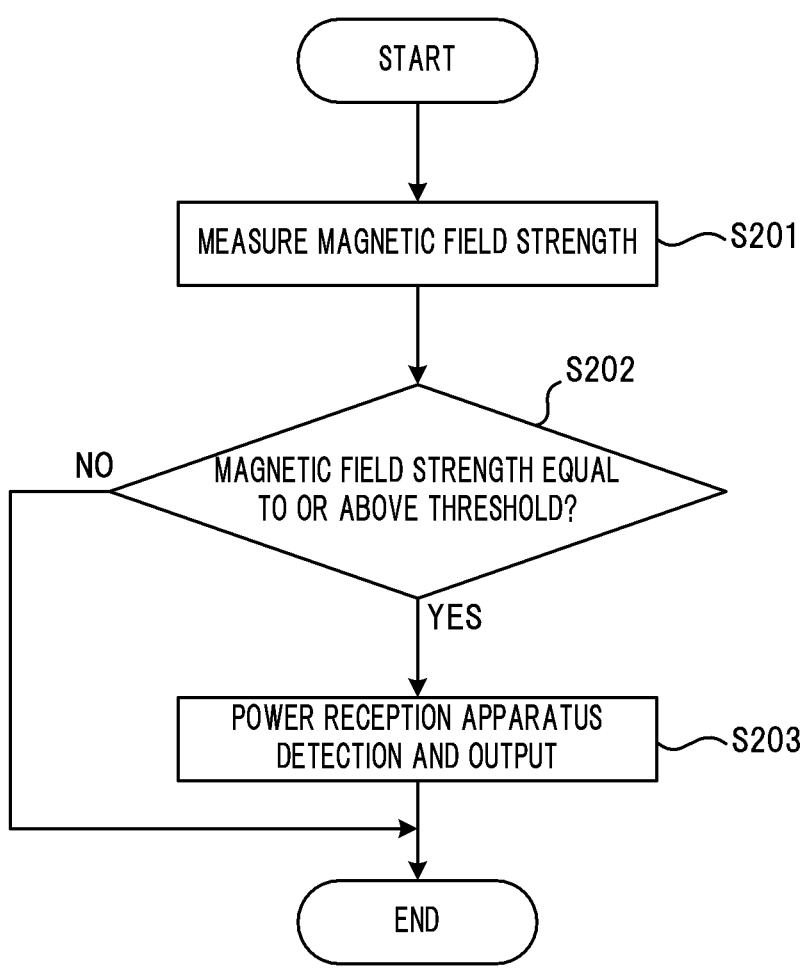
FIG. 5 is a flowchart describing the details of power reception apparatus detection processing.

FIG. 5 is a flowchart describing the details of the power reception apparatus detection processing. When the power reception apparatus detection processing is started, the sensor 25 measures a magnetic field strength (S201), and the power reception apparatus detector 41 determines whether or not the magnetic field strength is equal to or above a threshold (S202). Since the magnetic field strength is obtained as the value of a current output from the sensor 25, the power reception apparatus detector 41 determines the magnetic field strength by comparing the current value and the threshold.

When the determination result of the power reception apparatus detector 41 illustrates that the magnetic field strength is below a given value (No in S202), the power reception apparatus detector 41 stops the power reception apparatus detection processing. On the other hand, when the magnetic field strength is equal to or above the threshold (Yes in step S202), the power reception apparatus detector 41 outputs successful detection of a power reception apparatus (S203), whereby the processing ends.

Note that the power reception apparatus detection processing illustrated in FIG. 5 is an example, and any technique may be used for detecting the approach of the power reception apparatus 3. For instance, the power reception apparatus 3 may be detected by providing a separate optical sensor. In addition, in the case of detecting magnetic resonance as described above, the output of an ac power source may be controlled to be lower in power reception apparatus detection processing than at the time of supplying power.

Figure 6:
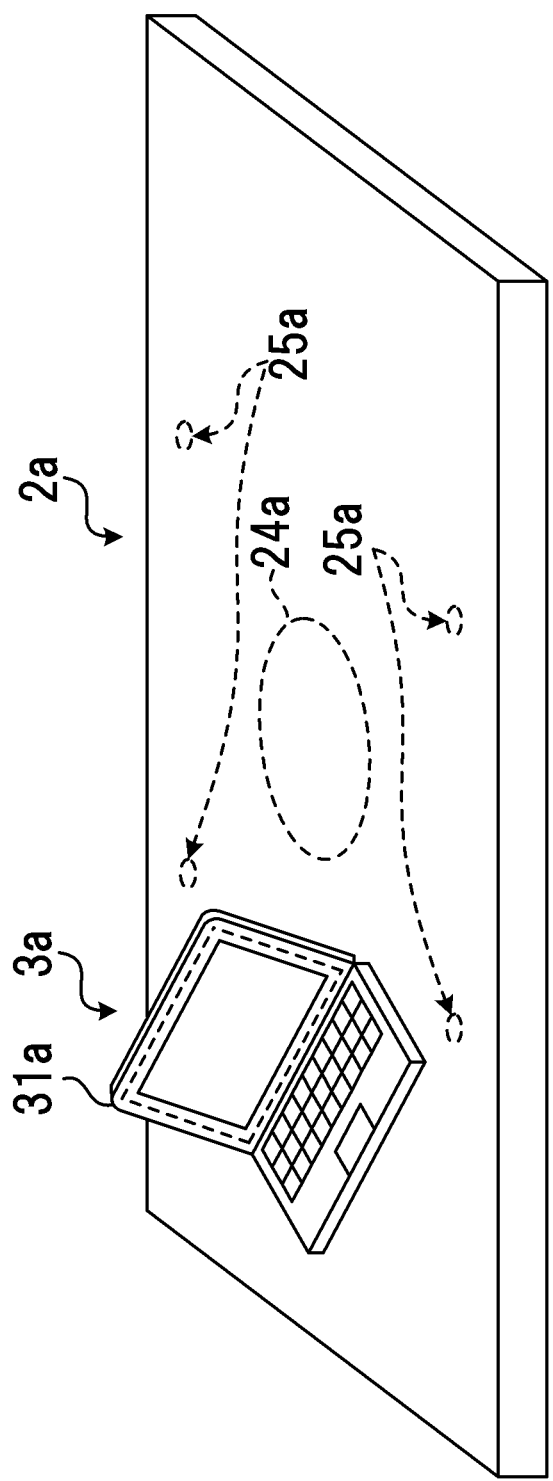
FIG. 6 is an explanatory diagram for explaining an example of an application in which a table is a power transmission apparatus and a portable computer is a power reception apparatus.

Examples of applications of the power transmission/reception apparatus 1 will now be described. FIG. 6 is an explanatory diagram for explaining an example of an application in which a table 2a is a power transmission apparatus and a portable computer 3a is a power reception apparatus. Referring to FIG. 6, the table 2a includes a power transmission coil 24a and sensors 25a embedded in the top board thereof. The portable computer 3a includes a power reception coil 31a embedded in the display frame thereof. Hence, the portable computer 3a may receive wireless power supply from the table 2a.

Figure 7:
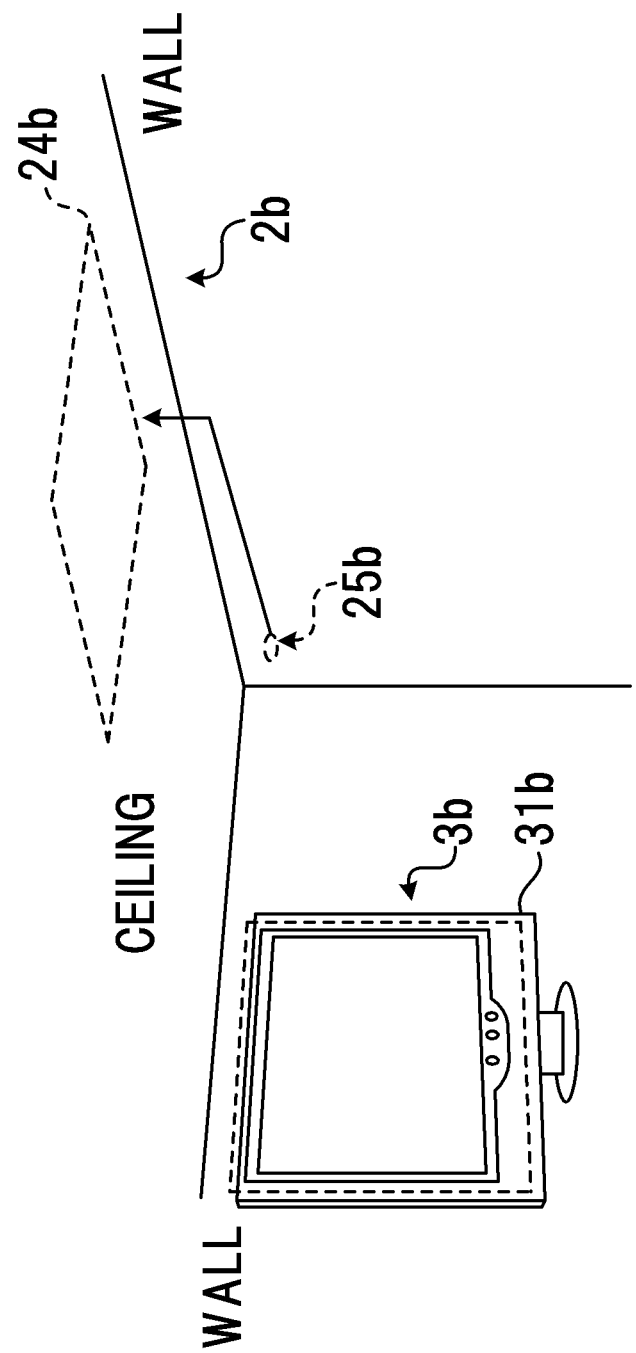
FIG. 7 is an explanatory diagram for explaining an example of an application in which a power transmission apparatus is embedded partly in a ceiling and partly in a wall, and a flat panel television is a power reception apparatus.

FIG. 7 is an explanatory diagram for explaining an example of an application in which a power transmission apparatus is embedded partly in a ceiling and partly in a wall, and a flat panel television is a power reception apparatus. Referring to FIG. 7, a power transmission coil 24b is embedded in the ceiling, a sensor 25b is embedded in the wall, and a power reception coil 31b is embedded in the enclosure frame of a flat panel television 3b, whereby the flat panel television 3b may receive wireless power supply from the power transmission coil 24b.

The state of magnetic resonance when a peak has split will now be further explained. FIGS. 8A and 8B to 12A and 12B illustrate simulation results obtained under the conditions that the power transmission coil 24 and the power reception coil 31 are respectively arranged on the lower and upper sides, and both coils have the following characteristics: conductivity=$9.98\times10^6$ (S/m), coil radius=0.300 (m), coil wire radius=0.020 (m), capacitor relative dielectric constant=10, capacitor area=0.0138 (m$^2$), and capacitor separation=0.04 (m).

Figure 8A:
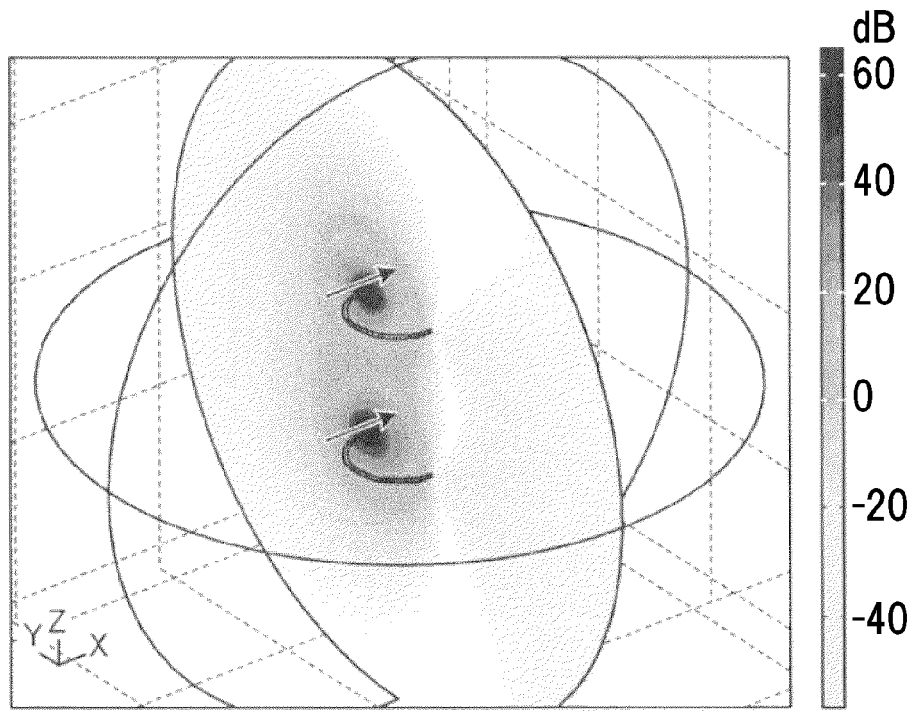
FIGS. 8A and 8B are explanatory diagrams for explaining electric field distribution and magnetic field distribution for f=8.6134 MHz.
Figure 8B:
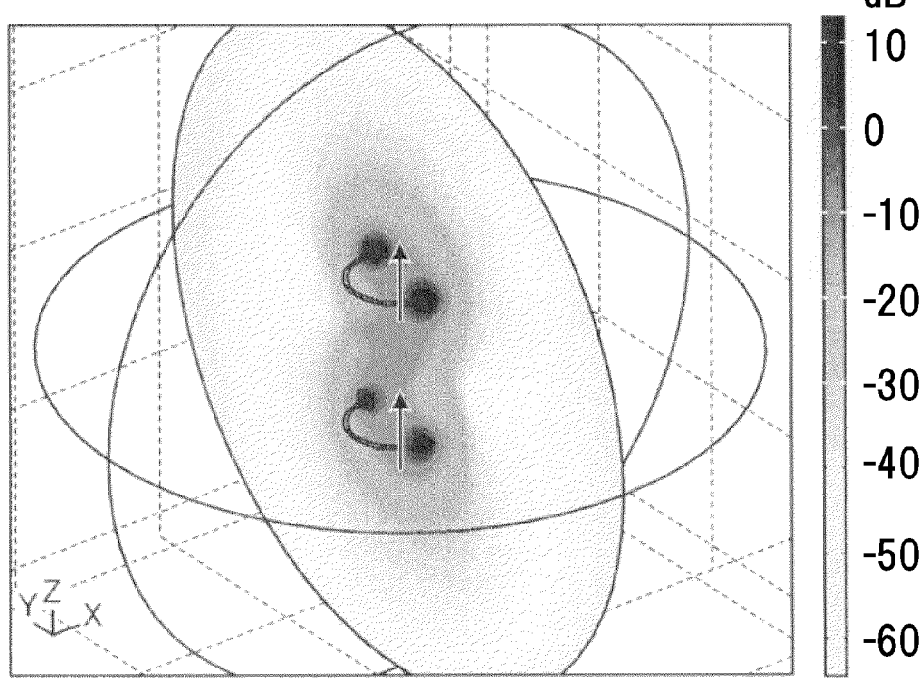

FIGS. 8A and 8B are explanatory diagrams illustrating an electric field distribution and a magnetic field distribution for f=8.6134 MHz. FIGS. 8A and 8B illustrate the states in which respective coils are resonating and the intensities of the electric field and magnetic field are maximums. The dual-line semicircles represent coils, and the small circles at the tips of the semicircles represent capacitors. These coils and capacitors constitute resonant circuits. The lower coil is the power transmission coil 24, and the upper coil is the power reception coil 31. FIG. 8A illustrates the electric field distribution, and only the X axis component is illustrated using an ellipse shaded in gray scale. FIG. 8B illustrates the magnetic field distribution, and only the Z axis component is illustrated using an ellipse shaded in gray scale. In each of the coils, energy goes and returns between the coil and capacitor when resonance is generated. For instance, when the potential of the capacitor becomes maximum, the electric field distribution becomes maximum, as illustrated in FIG. 8A. After the potential of the capacitor has become a maximum, the energy gradually moves to the coil. In other words, a current flows through the coil and the energy is converted to energy in the form of a magnetic field. When the current flowing through the coil increases to the maximum, the intensity of the magnetic field becomes maximum, as illustrated in FIG. 8B. When two coils that may resonate are arranged with such a distance therebetween that enables resonance, and at least one of the coils is made to enter a resonant states, and generated magnetic fields influence each other, whereby the resonant state illustrated in FIGS. 8A and 8B are generated. Note that FIGS. 8A and 8B illustrate an emphasized electrical field and a magnetic field using a logarithmic scale, since it is difficult to represent the extent of the distribution of the electric or magnetic field.

Figure 9A:
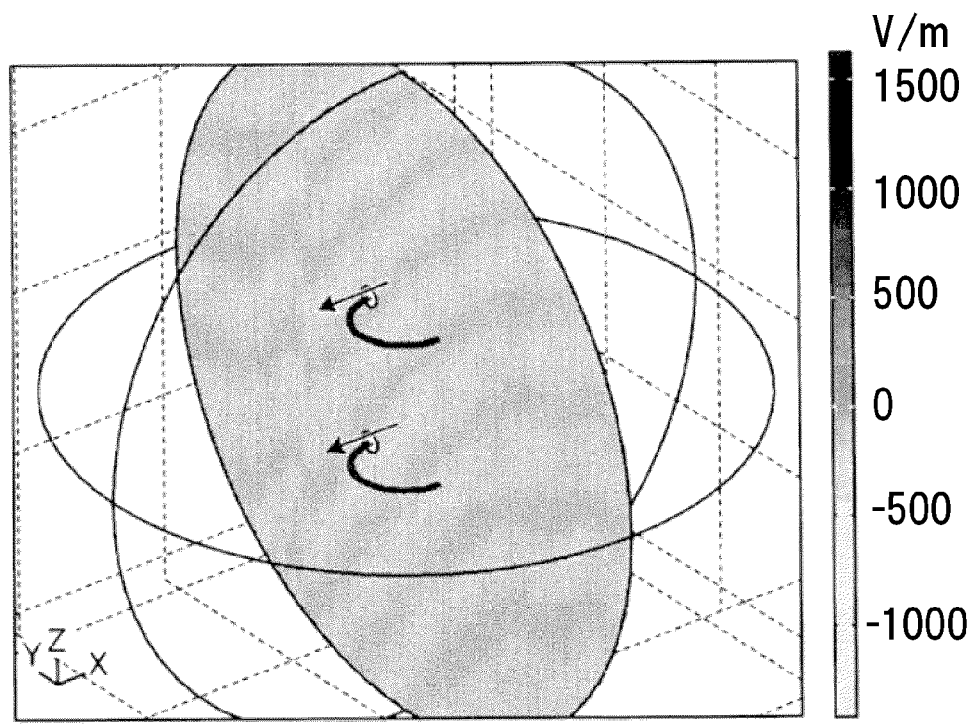
FIGS. 9A and 9B are explanatory diagrams for explaining electric field distribution and magnetic field distribution for f=8.6134 MHz and a phase of 0 degrees (assuming that a phase of 0 degrees corresponds to a state in which the electric field is concentrated in a capacitor)
Figure 9B:
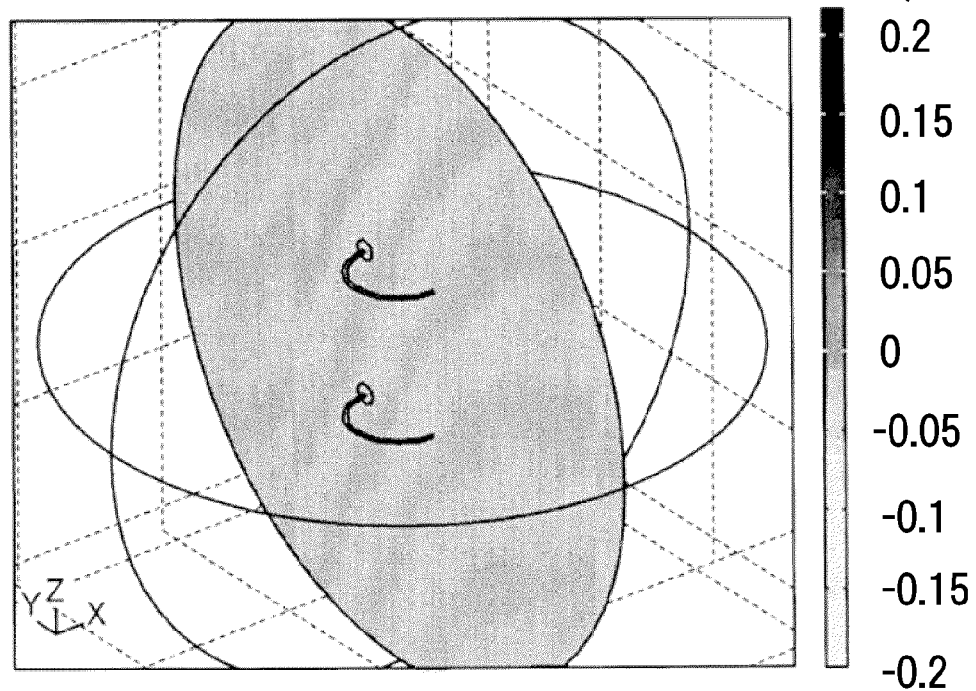
Figure 10A:
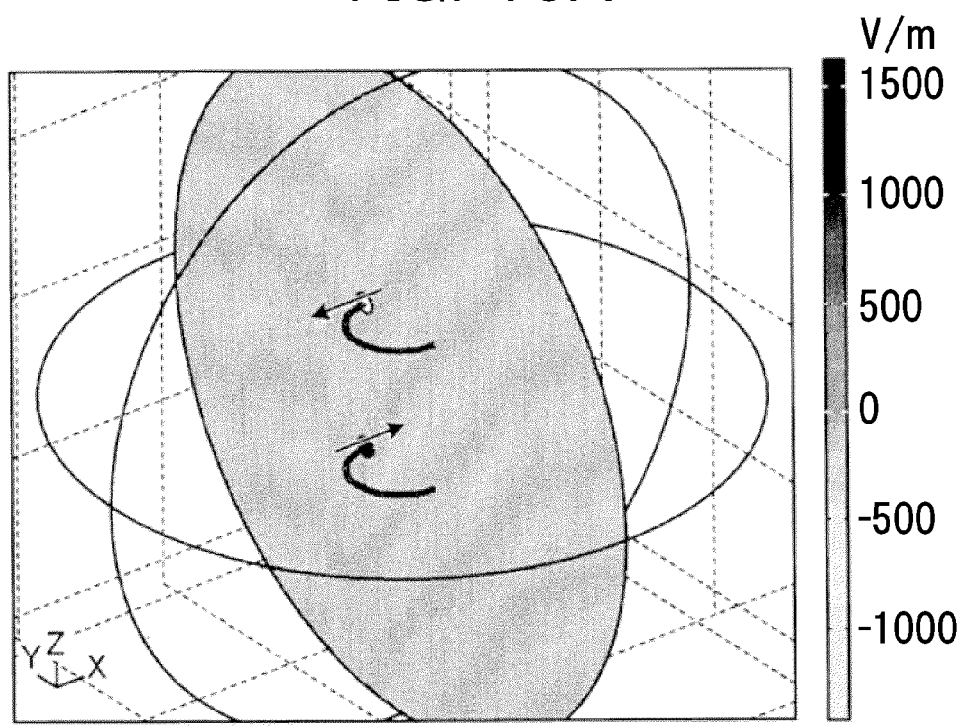
FIGS. 10A and 10B are explanatory diagrams for explaining electric field distribution and magnetic field distribution for f=8.7211 MHz and a phase of 0 degrees (assuming that a phase of 0 degrees corresponds to a state in which the electric field is concentrated in a capacitor)
Figure 10B:
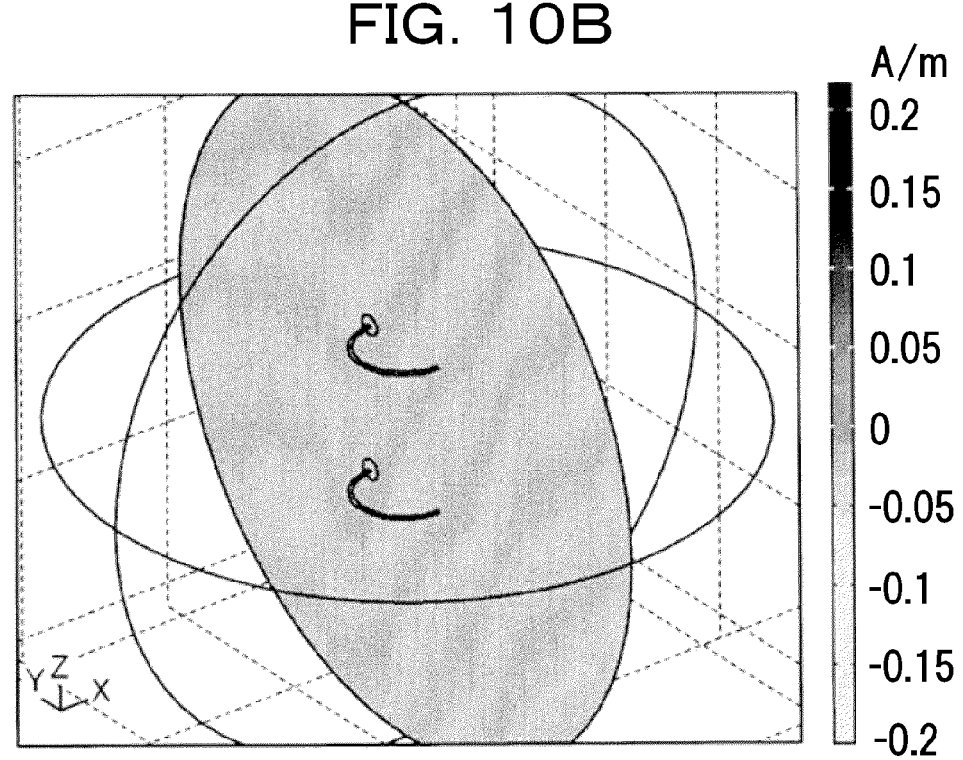

Next, the state in which the intensity of the electric field becomes maximum is explained with reference to FIGS. 9A and 9B, and FIGS. 10A and 10B. Note that the state in which the intensity of an electric field becomes maximum is called a 0-degree-phase state for the sake of convenience. FIGS. 9A and 9B, and FIGS. 10A and 10B illustrate each of the peaks in a state where a resonance frequency peak has split. FIGS. 9A and 9B correspond to the state of resonance on the lower frequency side, and FIGS. 10A and 10B correspond to the state of resonance on the higher frequency side. In other words, FIGS. 9A and 9B illustrate a comparative example for the present embodiment, and FIGS. 10A and 10B illustrate the present embodiment. FIGS. 9A and 9B respectively illustrate the electric field distribution and magnetic field distribution for f=8.6134 MHz and a phase of 0 degrees. Note that the X component of the electric field and the Z component of the magnetic field are illustrated. FIGS. 10A and 10B respectively illustrate the electric field distribution and magnetic field distribution for f=8.7211 MHz and a phase of 0 degrees. Note that the X component of the electric field and the Z component of the magnetic field are illustrated.

FIGS. 9A and 9B, and FIGS. 10A and 10B correspond to the state in which all the energy is included in the electric field in the oscillation, and the magnetic field is zero in both cases. When the electric fields in FIGS. 9A and 10A are compared, negative charge is stored in both the power transmission coil 24 and the power reception coil 31 at f=8.6134 MHz as illustrated in FIG. 9A, whereas positive charge is stored in the power transmission coil 24 and negative charge is stored in the power reception coil 31 at f=8.7211 MHz as illustrated in FIG. 10A.

Figure 11A:
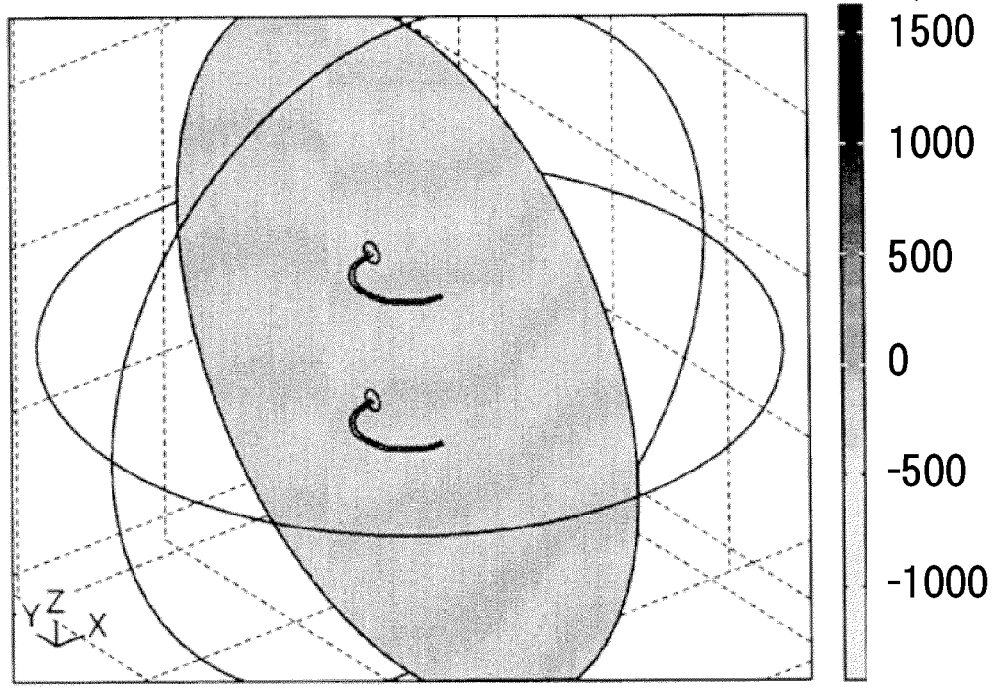
FIGS. 11A and 11B are explanatory diagrams for explaining electric field distribution and magnetic field distribution for f=8.6134 MHz and a phase of 90 degrees (advanced by 90 degrees compared with the phase of FIGS. 9A and 9B, and FIGS. 10A and 10B)
Figure 11B:
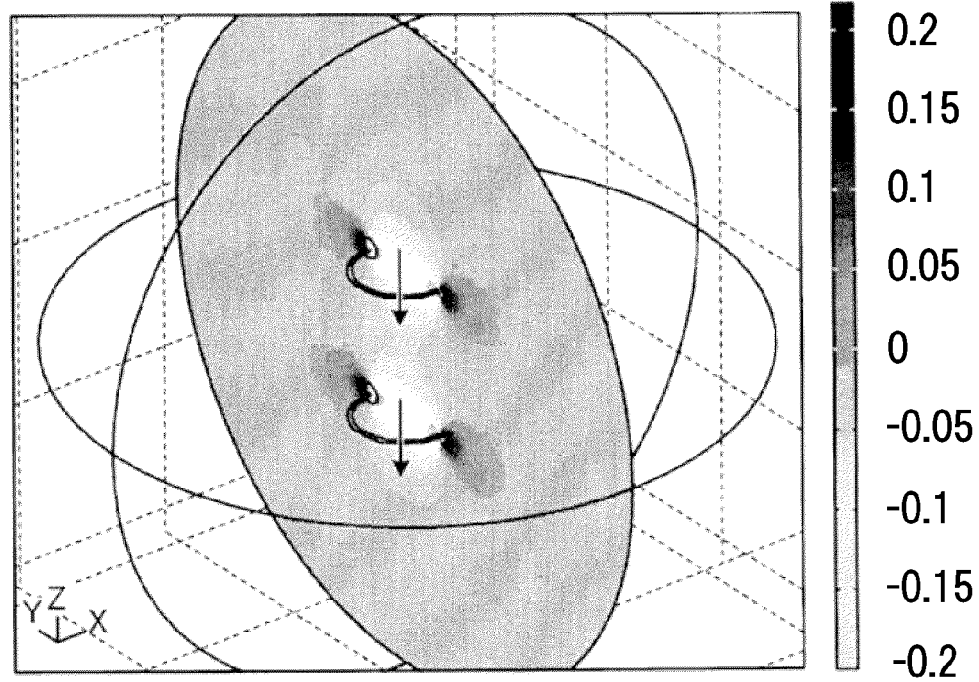
Figure 12A:
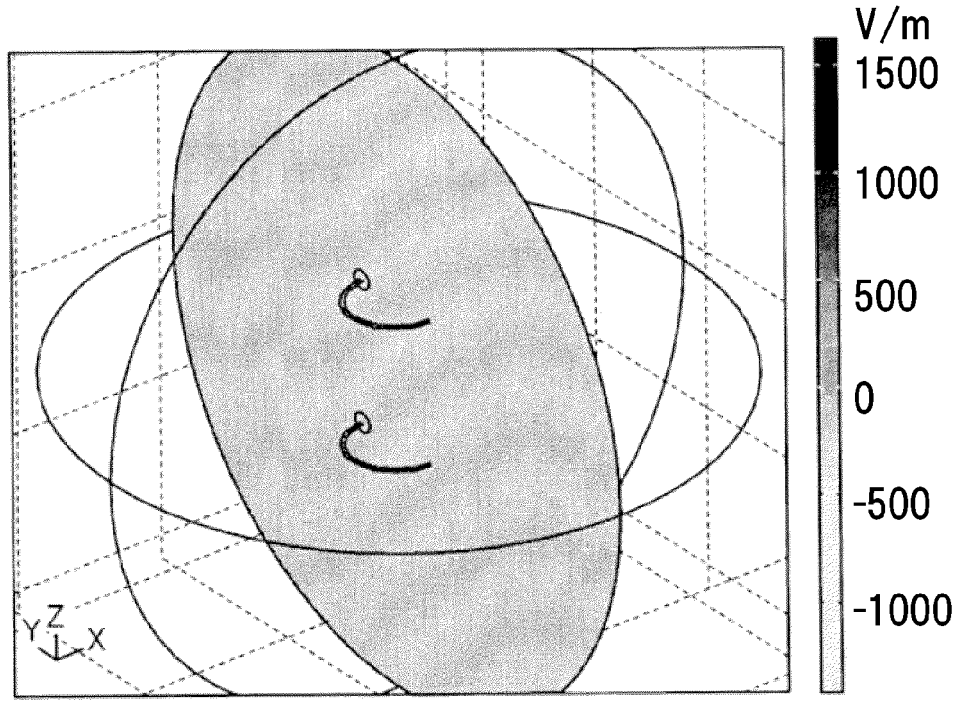
FIGS. 12A and 12B are explanatory diagrams for explaining electric field distribution and magnetic field distribution for f=8.7211 MHz and a phase of 90 degrees (advanced by 90 degrees compared with the phase of FIGS. 9A and 9B, and FIGS. 10A and 10B)
Figure 12B:
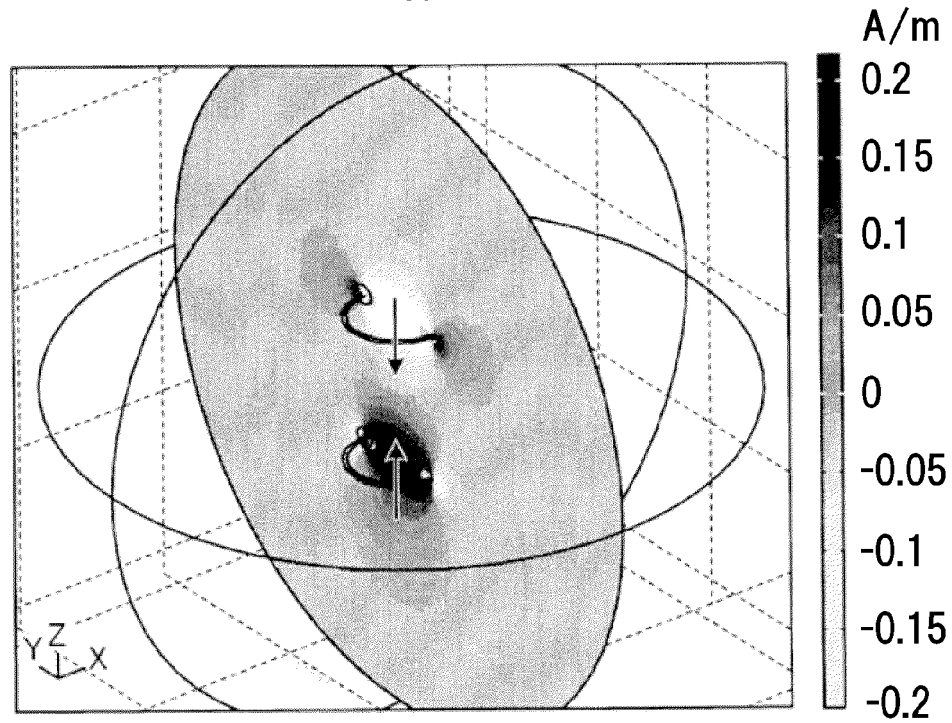

Next, the state in which the intensity of the magnetic field becomes maximum is explained with reference to FIGS. 11A and 11B, and FIGS. 12A and 12B. Note that the state in which the intensity of an electric field becomes maximum is called a +90-degree-phase state, compared with FIGS. 9A and 9B and FIGS. 10A and 10B, for the sake of convenience. FIGS. 11A and 11B, and FIGS. 12A and 12B illustrate each of the peaks in a state where a resonance frequency peak has split. FIGS. 11A and 11B correspond to the state of resonance on the lower frequency side, and FIGS. 12A and 12B correspond to the state of resonance on the higher frequency side. In other words, FIGS. 11A and 11B illustrate a comparative example for the present embodiment, and FIGS. 12A and 12B illustrate the present embodiment. FIGS. 11A and 11B respectively illustrate the electric field distribution and magnetic field distribution for f=8.6134 MHz and a phase of 90 degrees. Note that the X component of the electric field and the Z component of the magnetic field are illustrated. FIGS. 12A and 12B respectively illustrate the electric field distribution and magnetic field distribution for f=8.7211 MHz and a phase of 90 degrees. Note that the X component of the electric field and the Z component of the magnetic field are illustrated.

FIGS. 11A and 11B, and FIGS. 12A and 12B correspond to the state in which all the energy is included in the magnetic field in the resonance, and the electric field is zero in both cases. When the magnetic fields in FIGS. 11B and 12B are compared, negative magnetic fields exist in both the power transmission coil 24 and the power reception coil 31 at f=8.6134 MHz as illustrated in FIG. 11B, whereas a positive magnetic field exists in the power transmission coil 24 and a negative magnetic field exists in the power reception coil 31 at f=8.7211 MHz as illustrated in FIG. 12B.

From these simulation results, it is confirmed that the power transmission coil 24 and the power reception coil 31 resonate with the same phase at the lower frequency side drive frequency f=8.6134 MHz, and the power transmission coil 24 and the power reception coil 31 resonate with opposite phases at the higher frequency side drive frequency f=8.7211 MHz.

As illustrated by the magnetic field distribution in FIG. 11B, a strong negative magnetic field exists from the power transmission coil 24 up to the power reception coil 31 at the lower frequency side drive frequency f=8.6134 MHz. On the other hand, at the higher frequency side drive frequency f=8.7211 MHz as illustrated by the magnetic field distribution in FIG. 12B, the magnetic field between the power transmission coil 24 and the power reception coil 31 is weak, and there also exists a space where the magnetic field is zero.

As described above, since the power transmission/reception apparatus 1 according to the present embodiment detects splitting of a drive frequency at which the electric power supplied to the power reception apparatus 3 has a peak, and causes magnetic resonance to be generated by using the higher of the split drive frequencies as a drive frequency, a magnetic field between a power transmission coil and a power reception coil is made very small. In other words, the present embodiment allows a magnetic field between resonating coils to be made very small, as is illustrated by the significant difference between the comparative example and the present embodiment in FIGS. 11B and 12B illustrating magnetic field distribution.

In addition, the configuration is allowed to be simplified by detecting the magnetic field strength near the power transmission coil and thereby detecting a power reception apparatus and searching for a peak. Note that as other embodiments, it is possible to detect a power reception apparatus and search for a peak by using a method other than detection of a magnetic field strength, or to arrange a sensor at any position, such as near a power reception apparatus.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a illustrating of the superiority and inferiority of the invention. Although the embodiments of the present inventions have been described in detail, it should be understood that the various changes, substitutions, and alterations could be made hereto without departing from the spirit and scope of the invention.

The invention claimed is:

1. A power transmission apparatus comprising:
    a power source;
    a power transmission coil that transmits electric power supplied from the power source outward as magnetic energy through magnetic resonance;
    a peak searching unit that searches for a drive frequency at which the magnetic energy transmitted outward has a peak;
    a peak split detector that detects splitting of the drive frequency at which the magnetic energy transmitted outward has a peak;
    a selection unit that selects a higher-frequency side frequency among split drive frequencies generated by the splitting; and
    a drive unit that drives the power transmission coil using the frequency selected by the selection unit.

2. The power transmission apparatus according to claim 1, further comprising:
    a power supply coil that supplies electric power from the power source to the power transmission coil through electromagnetic induction.

3. The power transmission apparatus according to claim 1, further comprising:
    a magnetic field sensor that measures the magnetic energy transmitted outward by the power transmission coil,
    wherein the peak detector searches for a drive frequency at which the magnetic energy transmitted outward has a peak on the basis of a change in a measurement result of the magnetic field sensor caused by changing the drive frequency.

4. The power transmission apparatus according to claim 3, further comprising:
    a monitoring unit that monitors the measurement result obtained by the magnetic field sensor by fixing the drive frequency,
    wherein the peak searching unit starts to search for a drive frequency at which the magnetic energy transmitted outward has a peak when the measurement result of the magnetic field sensor has been determined to exceed a threshold from a result of monitoring performed by the monitoring unit.

5. The power transmission apparatus according to any one of claim 1, wherein the power transmission coil has a resonance frequency corresponding to a resonance frequency of a power reception coil that receives magnetic energy through magnetic resonance.

6. A power transmission/reception apparatus that supplies electric power from a power transmission coil in a power transmission apparatus to a power reception coil in a power reception apparatus by causing magnetic resonance to be generated between the power transmission coil and the power reception coil, the power transmission/reception apparatus comprising:
    a peak searching unit that searches for a drive frequency for the power transmission coil at which the electric power supplied through the magnetic resonance has a peak;
    a peak split detector that detects splitting of the drive frequency at which the electric power supplied through the magnetic resonance has a peak;
    a selection unit that selects a higher-frequency side frequency among split drive frequencies generated by the splitting; and
    a drive unit that drives the power transmission coil using the frequency selected by the selection unit.

7. A control method of transmitting electric power from a power transmission coil to a power reception coil by causing magnetic resonance to be generated between the power transmission coil and the power reception coil, the control method comprising:
    searching for a drive frequency at which the electric power supplied through the magnetic resonance has a peak;
    detecting splitting of the drive frequency at which the electric power supplied through the magnetic resonance has a peak;
    selecting a higher-frequency side frequency among split drive frequencies generated by the splitting; and
    driving the power transmission coil using the frequency selected in the selecting.

* * * * *